US012809671B2

(12) United States Patent
Maia et al.

(10) Patent No.: US 12,809,671 B2
(45) Date of Patent: Nov. 24, 2026

(54) TASK SCHEDULING IDENTIFICATION FOR EFFICIENT TASK-AGNOSTIC CONTINUAL LEARNING

(71) Applicant: Dell Products L.P., Round Rock, TX (US)

(72) Inventors: Isabella Costa Maia, São Paulo—SP (BR); Karen Braga Enes, Belo Horizonte—MG (BR); Karen Stéfany Martins, Belo Horizonte—MG (BR); Luiz Fernando Sommaggio Coletta, Tupã—SP (BR); Pablo Nascimento da Silva, Niterói—RJ (BR)

(73) Assignee: Dell Products L.P., Round Rock, TX (US)

( * ) Notice: Subject to any disclaimer, the term of this patent is extended or adjusted under 35 U.S.C. 154(b) by 443 days.

(21) Appl. No.: 18/494,647

(22) Filed: Oct. 25, 2023

(65) Prior Publication Data

US 2025/0138876 A1 May 1, 2025

(51) Int. Cl.
*G06F 9/44* (2018.01)
*G06F 9/48* (2006.01)

(52) U.S. Cl.
CPC ...... *G06F 9/4881* (2013.01); *G06F 2209/486* (2013.01)

(58) Field of Classification Search
CPC ......................... G06F 9/4881; G06F 2209/486
USPC ........................................................ 718/102
See application file for complete search history.

(56) References Cited

U.S. PATENT DOCUMENTS

2020/0082296 A1* 3/2020 Fly .......................... G06F 17/18
2022/0036201 A1* 2/2022 Tamir ..................... G06N 20/10

OTHER PUBLICATIONS

Wang, Zifeng, et al. "Learning to prompt for continual learning." Proceedings of the IEEE/CVF Conference on Computer Vision and Pattern Recognition. 2022.
De Lange, Matthias, et al. "A continual learning survey: Defying forgetting in classification tasks." IEEE transactions on pattern analysis and machine intelligence 44.7 (2021): 3366-3385.
Srikant, Ramakrishnan, and Rakesh Agrawal. "Mining sequential patterns: Generalizations and performance improvements." Advances in Database Technology-EDBT'96: 5th International Conference on Extending Database Technology Avignon, France, Mar. 25-29, 1996 Proceedings 5. Springer Berlin Heidelberg, 1996.
Wang, Zifeng, et al. "Dualprompt: Complementary prompting for rehearsal-free continual learning." Computer Vision- ECCV 2022: 17th European Conference, Tel Aviv, Israel, Oct. 23-27, 2022, Proceedings, Part XXVI. Cham: Springer Nature Switzerland, 2022.

* cited by examiner

*Primary Examiner* — Timothy A Mudrick
(74) *Attorney, Agent, or Firm* — Workman Nydegger

(57) ABSTRACT

One example method includes training a task-agnostic continual learning (CL) model using prompt pool parameters and scheduling identification parameters, where the CL model comprises a machine learning model that is operable to perform tasks, monitoring a datastream that is provided to the CL model, and identifying every c instances of the datastream as a collection so that one or more collections are defined, and identifying, based on analysis of the datastream, a task scheduling type embodied in the datastream.

20 Claims, 4 Drawing Sheets

400

402

| | PROMPT ID | | | |
|---|---|---|---|---|
| INSTANCE ID | 0 | 1 | 2 | 3 |
| 0 | 1 | | | 2 |
| 1 | 1 | | | 2 |
| 2 | | 1 | 2 | |
| 3 | 2 | 1 | | |
| 4 | 2 | | | 1 |

404

500

| SUPPORT | ITEMSETS (PROMPT ID) |
|---|---|
| 0.8 | {0} |
| 0.4 | {1} |
| 0.6 | {0,3} |
| 0.2 | {0,1} |

502

600

602

| COLLECTION $i$ | VECTOR |
|---|---|
| 0 | {0}, {1}, {0,3} |
| 1 | {1}, {0,3} |
| ... | |
| $l$ | {0,1} |

604

TASK SCHEDULING IDENTIFICATION FOR EFFICIENT TASK-AGNOSTIC CONTINUAL LEARNING

FIELD OF THE INVENTION

Embodiments of the present invention generally relate to continual learning. More particularly, at least some embodiments of the invention relate to systems, hardware, software, computer-readable media, and methods, for task scheduling identification implemented in a task-agnostic continual learning context.

BACKGROUND

Continual learning (CL) studies the problem of building machine learning models that continuously learn through a sequence of tasks, so that new knowledge is acquired without forgetting tasks already learned, that is, 'catastrophic forgetting.' Task-agnostic continual learning can be seen as one specific and challenging scenario, where task identities and boundaries are not known to the learning algorithm during training. For example, during a given time, a task arrives for training, but the learning algorithm does not have any information about the task, which may be something such as the image classification of a specific object like cars, nor the boundaries of the task, such as when the task ends. Thus, images of cars may appear together with images of motorcycles.

Some algorithms tailored to deal with task agnostic continual learning have proposed a prompt pool for instance, and use a frozen Visual Encoder Transformer (ViT), a pool of prompts for task identification, and a trained classification head. This approach, referred to as L2P, learns continually by adding prompts to the model input, and a group of prompts represents a task. These prompts are selected by mapping the input space into a learnable space of keys. However, one challenge of using these algorithms in practice is that the algorithm parameters, and consequently the algorithm performance, are directly dependent on the scheduling of the tasks that are arriving for training. Thus, correctly identifying the scheduling is required for the application of this method.

The literature defines two types of scheduling: (i) discrete, and (ii) continuous, scheduling. In the discrete case, tasks arrive sequentially with no overlap between them, although the learning algorithm has no awareness or knowledge of this, while in the continuous scenario, the algorithm may allow some overlapping of tasks. Thus, conventional approaches present at least two problems, namely, the inability to identify the task scheduling regime of the data stream, so as to be able to train a task-agnostic continual learning method, and the inability to efficiently adapt continual learning method parameters on-the-fly based on a scheduling regime.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
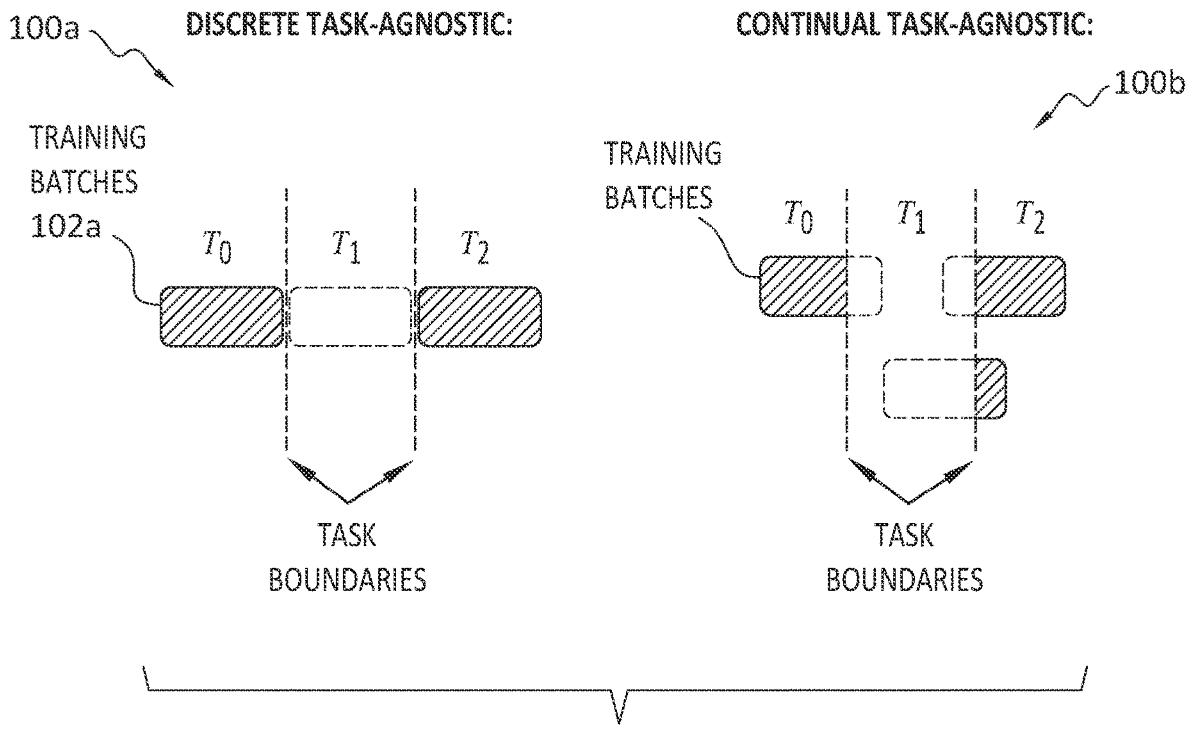
FIG. 1 discloses aspects of discrete, and continuous, scheduling.

Embodiments of the present invention generally relate to continual learning. More particularly, at least some embodiments of the invention relate to systems, hardware, software, computer-readable media, and methods, for task scheduling identification implemented in a task-agnostic continual learning context.

One example embodiment of the invention is directed to a method that comprises an initialization phase, a datastream monitoring phase, and a scheduling identification and model adaptation phase. The initialization phase may comprise operations including defining prompt pool parameters, defining scheduling identification parameters, and training a task-agnostic continual learning model, using the prompt pool parameters and scheduling identification parameters.

The datastream monitoring phase may comprise monitoring the datastream, and for every c instances in the datastream, defining a collection that comprises the c instances. Note that as used herein, an object may be considered as being an 'instance' of a class. Put another way, an instance of a datastream may be an object that belongs to a particular class and/or has been labeled as belonging to a particular class. Thus, an 'instance' may be an example or sample in the data stream such as, for example, an image to which an ML classification pipeline may be applied.

The datastream monitoring phase may end when a predefined number of collections l have been obtained. The datastream monitoring phase may be followed by the scheduling identification and model adaptation phase, which may comprise, for each of the collections, building a vector based on the instances of the collection, comparing subsequent vectors with that vector to determine a scheduling type, and then, based on the scheduling, adapting applicable parameters of the CL model.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that continual learning may be implemented even when a task to be learned by a model is not known to the model. An embodiment may implement continuous learning through identification of a task scheduling regime of a datastream. An embodiment may implement, on the fly, updates to a model based on an identified scheduling regime. Various other advantages of one or more example embodiments will be apparent from this disclosure.

A. Context for an Example Embodiment

The following is a discussion of aspects of an example context for various embodiments of the invention. This discussion is not intended to limit the scope of the invention, or the applicability of the embodiments, in any way.

A.1 Continual Learning (CL)

Continual learning, also referred to as lifelong learning, sequential learning, or incremental learning, is a growing ML (machine learning) paradigm that aims to learn new tasks continuously and adaptively by adding knowledge to the model without sacrificing the previously acquired knowledge. Unlike traditional architectures that focus on solving a single task at a time, CL allows training a single model to perform many tasks using less computational power and model storage. CL also deals with the stability-plasticity dilemma, which focuses on accumulating knowledge (plasticity) without catastrophically forgetting prior knowledge gained (stability). A single model capable of performing multiple tasks takes advantage of learned concepts such as forward and backward transfer. The knowledge earlier acquired is used in the new tasks, and the new task examples improve already learned ones, which avoid restarting the training process from zero and leads to better generalization. Thus, CL is an interesting alternative for models performing on the edge with processing and storage constraints. Another advantage is coping with the existing dynamism in the edge nodes incoming data, an issue that can be addressed by CL methods, since they naturally offer parsimonious ways to adapt ML models to changes. Generally, CL is divided in three scenarios: domain-, task- and class-incremental learning. In the first one, tasks have the same classes, but input distributions are different. In task-incremental learning, the model is informed about which task needs to be performed, allowing models with task-specific components. Differently, in class-incremental, models must be able to both solve each task seen so far and infer which one they are presented with. All three scenarios assumes that task boundaries are known during training, which can be a disadvantage when task identity is not available. Task-agnostic continual learning focuses on this hard scenario where we do not know task boundaries during training.

CL approaches may be divided into three main strategies: regularization-, memory-, and architecture-based. Regularization-based solutions avoid storing raw inputs from previous tasks. To do that, an extra regularization term is introduced in the loss function, consolidating previous knowledge when learning on new data. On the other hand, memory-based solutions, also known as rehearsal, store samples from previous tasks in an 'episodic memory,' that is, a small-sized memory buffer formed by previous important samples, and replay the samples while learning a new task. Different from previous solutions, architecture-based, also known as parameter isolation, focuses on the idea that different tasks should have their own set of isolated parameters. Therefore, it freezes, or adds, a set of parameters to each task.

A.2 Scheduling

In general, a schedule defines how a data distribution, which may be used to train a model, or may be provided as an input to a model to obtain model outputs, such as inferences, evolves over training. There are two types of scheduling according to the task transition: discrete and continual. In the continuous scheduling, during the training phase, the algorithm does not know when samples from a given task stop arriving to the classifier nor the task from which every sample belongs to, for example, the training process may receive a batch of data samples from two different tasks at the same time, without knowing the task that each sample belongs to. While the continual scheduling has a smooth task transition, the discrete scheduling has an abrupt task transition. In other words, in the discrete scheduling scenario, the algorithm knows the task boundaries, but the identity of each sample is unknown. FIG. 1 illustrates both discrete and continual scheduling.

In particular, FIG. 1 discloses a discrete, task-agnostic scheduling scenario 100*a*. As shown, a model may receive a datastream that comprises training batches 102*a*, that is, batches of training data. The training batches 102*a* may each be received in a respective discrete timeframe that corresponds to a particular task, thus, the first training batch is received for a task $T_0$, the second training batch is received for the task $T_1$, and the third training batch for the task $T_2$. Thus, each of the training batches 102*a* may correspond to a particular task, and the task boundaries may be defined the training batches 102*a* which, in turn, may be received by the model in respective discrete timeframes. Thus, it may be relatively easy for the model to discern which task each of the training batches 102*a* belongs to.

On the other hand, in a continual, task-agnostic scheduling scenario 100*b*, the training batches 102*b* do not necessarily arrive in serial fashion. Thus, the model does not know when all training batches for a given task have arrived, nor which respective tasks the training batches belong to. As shown in the example of FIG. 1, respective portions of three different training batches may arrive at the model within a timeframe that corresponds to particular task boundaries. Accordingly, it may be difficult, or impossible, for the model to determine which training batch corresponds to which task.

Thus, an example embodiment is directed to the task-agnostic CL where the algorithm is unaware of the tasks scheduling, so it cannot take any special action, and the algorithm, or model, has no knowledge that the data distribution changed. An example embodiment may comprise a pipeline to automatically identify that the scheduling has changed.

A.3 Learning to Prompt for Continual Learning (L2P)

Recent CL efforts have been focused on either adapting the model parameters or its architecture to conform to non-stationary data distributions, where catastrophic forgetting is the main challenge. These methods typically rely on rehearsal buffers, that is, reusing past data to train the model to recognize when data from a new task arrives, and known task identity. However, in real life scenarios, task identity is not always known and keeping previously used data might be prohibitive for both privacy and memory constrains.

The concept of prompt pool for continual learning was introduced in "Wang, Zifeng, et al. '*Learning to prompt for continual learning.' Proceedings of the IEEE/CVF Conference on Computer Vision and Pattern Recognition.* 2022" ("Wang"), which is incorporated herein in its entirety by this reference. Wang is based in the concept of a prompt pool, which considers a memory space that contains task-encoding information referred to as prompts. This memory space is structured as a group of key-value combinations and encodes both general information and task-specific knowledge. L2P applies a query mechanism to select k keys most similar to the input features. Each key is associated to a prompt which is prepended to the input tokens. This resulting concatenated vector is fed to a pretrained transformer encoder model. The prompt pool is optimized jointly with the supervised loss of a classification head, where the goal is learning to select and updating prompts to instruct the prediction of the classification layer.

Particularly, Wang notes that " . . . Given a pre-trained Transformer model, 'prompt-based learning' modifies the original input using a fixed template. Imagine a sentiment analysis task is given the input 'I like this cat.' A prompt-based method will transform the input to 'I like this cat. It looks X,' where the 'X' is an empty slot to be predicted (e.g., 'nice,' 'cute,' etc.) and 'It looks X' is the so-called prompt. By adding prompts to the input, one can condition the pre-trained models to solve many downstream tasks. While designing fixed prompts requires prior knowledge along with trial and error, prompt tuning prepends a set of learnable prompts to the input embedding to instruct the pre-trained backbone to learn a single downstream task, under the transfer learning setting."

One challenge of using L2P (as disclosed in Wang), however, is that its parameters are highly dependent on the training scheduling. Thus, correctly identifying the scheduling is essential to guarantee performance. There is a parameter referred to as 'diversifying prompt-selection' which can be enabled/disabled according to the data scheduling. However, the current implementation of L2P does not identify the scheduling automatically. By way of contrast, an embodiment comprises an approach to automatically identify the scheduling regime of the stream of data to adapt the algorithm, or model, parameters on the fly.

B. Overview of Aspects of an Example Embodiment

One example embodiment comprises a method for automatically identifying the scheduling regime of the stream of data. Thus, based on this information, an embodiment may adapt the parameters of the task-agnostic continual learning method on the fly. This disclosure references the use of L2P as an example, but an embodiment may be applied to any algorithm that is highly influenced by the scheduling and that is based on prompt pools.

CL methods based on prompt pool are a good alternative for performing task-agnostic continual learning at the edge. Further, business enterprises may benefit from it by adapting models continually in the edge independently of the task scheduling of the data stream, maximizing the potential of edge computing.

An embodiment may thus address the following problems: (1) identifying the task scheduling regime of the data stream to train a task-agnostic continual learning method; and (2) efficiently adapt continual learning method's parameters on-the-fly based on a scheduling regime.

More specifically, one embodiment comprises a method for the identification of a task scheduling in a data stream to correctly adapt the parameters of a task-agnostic continual learning method based on the scheduling change. For performing the scheduling identification, we rely on a prompt pool. This prompt pool is responsible for storing the knowledge from different tasks-note that prompt pools are used by many different methods as in the case of the L2P algorithm, discussed elsewhere herein. A prompt pool is basically a set of prompts, or encodings examples on the encoded space. These prompts are selected by the learning method based on their similarity to the encoding of the data input, such as L2P for example, and then used to describe a given task. They may be selected in groups of a predefined number of prompts (k). The idea behind the scheduling identification is looking at the frequency of prompts selected in a training data stream interval and, based on that, identifying the correct scheduling as continuous or discrete.

In an embodiment, a method may be as follows:

Phase 1—Initialization

1. Define the prompt pool parameters:
   a. the number of selected prompts (k) and
   b. the size of the prompt pool (p).
2. Define the Scheduling identification parameters:
   a. the look-up size in number of collections (l) and
   b. the number of instances (c) inside each collection of samples in the stream
3. Train a task-agnostic continual learning model (e.g, L2P.)

Phase 2—Monitoring the Data Stream

4. Start the data stream monitoring.
   a. Every c instances in the stream becomes a collection Phase 3—Identifying the Scheduling and Adapting the Model 5. When a pre-defined number of collections (l) is achieved
   a. For each collection:
      i. Build an instance vs prompt table where rows represent instances in the collection and columns are the prompt IDs. For each instance, mark their respective selected prompts. Find the frequent sequence of prompts with support superior to a minimum predefined threshold, s
      ii. Build a vector from the frequent sequence (each combination of prompt becomes a position in this vector)
   b. Compare subsequent vectors using a Jaccard distance
      i. If the distance is higher than a predefined threshold th:
         1. Collections are different, so the scheduling is discrete ii. Else:
1. Collections are similar, so the scheduling is continuous
c. Based on the scheduling, adapt the parameters of the continual learning model.

As will be apparent from the foregoing, and elsewhere in the disclosure, an example embodiment may comprise the following aspects and features:

1, A method to identify the scheduling regime in a data stream based solely on the selected prompts of the continual learning method—an embodiment may be applied with any continual learning algorithm based on prompt pool; and
2. A method for task-agnostic continual learning adaptable for different types of scheduling—an embodiment may automatically identify the scheduling and adapt the model parameters to learn a new task independently of the scheduling.

In connection with the foregoing, it is noted that there are various task-agnostic continual learning methods. However, these are typically configured to work on specific task scheduling, either discrete, or continuous, but not both. By way of contrast, an embodiment comprises a method that is adaptable to the change of domains, that is, between discrete and continuous task scheduling, and is also capable of identifying the correct task scheduling.

In terms of some example practical applications, the CL model may be deployed at an edge location, such as an edge node in a communications network, or other type of network, and may be used to process data generated at, and/or received by, the node. In another example, a CL model may participate in a federated learning process orchestrated by a central node that communicates with a group of edge nodes that each include their own instance of the CL model. In any implementation, respective instances of the CL model may be deployed at each node in a group of nodes. An embodiment may impose limited demands on node resources and, as such, may be particularly useful when deployed at edge nodes that may have limited memory, storage, and processing capabilities.

C. Detailed Description of Aspects of an Example Embodiment

One example embodiment comprises a method for automatically identifying the scheduling regime of a stream of data, which can then be used to adapt the parameters of the task-agnostic continual learning method on the fly.

In realistic scenarios of edge applications, the task scheduling can be difficult to identify since the order in which the system collects data for each one of the tasks may not be standardized. That is, data samples for each one of the tasks may arrive at a model, which may be hosted at an edge node for example, in any order, grouped by task, or not. Task-agnostic continual learning methods can perform learning on this type of scenario and, when the learning method is correctly calibrated to the task scheduling type, the results may be good. Thus, an embodiment comprises a method for looking at the stream of data collected in the edge, such as at one or more edge nodes for example, to identify the data scheduling and based on the identified data scheduling, update or adjust the parameters of the learning method, which may be implemented in/by an algorithm or model, accordingly.

An example embodiment may employ methods that rely on prompt pools to learn continually a variety of tasks. Every time a data sample arrives at the system, the data sample may be mapped to a collection of prompts that collectively define the task to be performed on the data sample. Based on this, an embodiment may, given a collection of data samples, summarize information relating to the collection and compare that collection with earlier collections. An embodiment may employ algorithms for sequence mining to describe and summarize the collection, and the difference between collections may then be checked. If there is a significant difference, larger than a threshold for example, it may be deemed that the collections are different and thus may implicate a discrete task scheduling, otherwise, if the collections are similar, that is, the difference between the collections is below the threshold, then the scheduling may be deemed to be continuous. Once the scheduling is defined, an embodiment may adjust the parameters of the learning methods accordingly.

Figure 2:
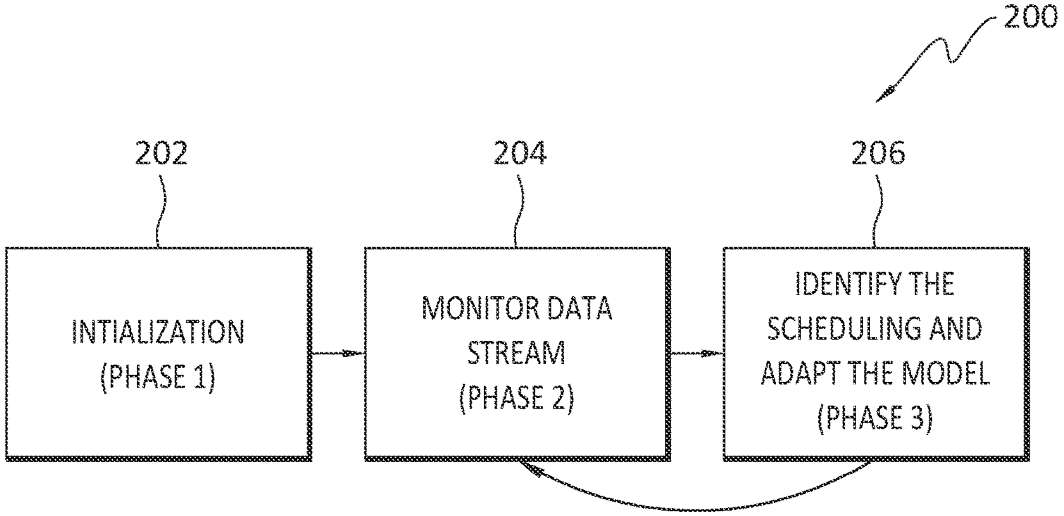
FIG. 2 discloses various phases of a method to automatically identify the scheduling regime and adapt a task-agnostic continual learning method on the fly, according to one embodiment.

With attention now to FIG. 2, one example embodiment comprises a method 200 with three phases. In general, the method 200 comprises three phases, and serves to automatically identify the scheduling regime, and then adapt, based on that scheduling regime, a task-agnostic continual learning method on the fly. As shown, the three phases comprise an initialization phase 202 (or 'Phase 1'), a datastream monitoring phase 204 (or 'Phase 2'), and a scheduling identification and model adaptation phase 206 (or 'Phase 3'), each of which is discussed in turn below. Note that Phase 2 and Phase 3 may be performed recursively in one embodiment, and Phase 1 may only need to be performed once.

In more detail, in Phase 1, the system is initialized, where this initialization comprises, in an embodiment, defining the L2P and scheduling parameters, and training a L2P model. Then, in Phase 2, an embodiment monitors the data stream that is incoming to the model or algorithm, to build collections of instances from the data stream. Lastly, in Phase 3, an embodiment identifies the scheduling type as either continuous or discrete, and adapts the task-agnostic CL method as/if required. After adapting the model at Phase 3, an embodiment may return to Phase 2 to build new collections. Note that, while L2P is employed in one example embodiment, any other method based on prompt pools may alternatively be employed in other embodiments. Thus, the scope of the invention is not limited to those embodiments that employ L2P.

C.1 Phase 1—Initialization

Figures 3, 4, 5:
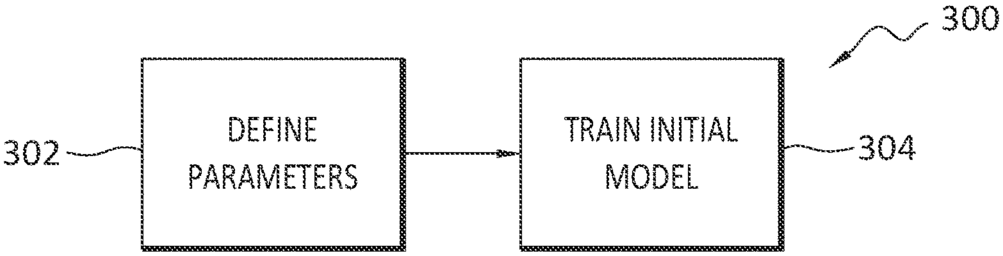
FIG. 3 discloses an overview of the first phase disclosed in FIG. 2, according to one embodiment.
FIG. 4 discloses an example of an instance vs prompt ID ordered table considering k=2, according to one embodiment.
FIG. 5 discloses examples of frequent sequences, according to one embodiment.

FIG. 3 discloses an example implementation 300 of Phase 1 of one embodiment. In this phase, an embodiment may define 302 the parameters needed to (1) identify the scheduling regime and (2) adapt the initial model. An embodiment may define the prompt pool algorithm parameters, in the illustrative case of L2P, thus: (1) number of selected prompts (k); and, (2) the size of the prompt pool (p). Next, as part of 302, or separately, an embodiment may define the scheduling parameters: (1) the look-up size in number of collections (l); and, (2) the number of instances inside each collection of samples (c) in the stream. After defining 302 the parameters, an embodiment may then select a dataset W containing data from a specific scheduling, and train 304 an initial L2P model, or other model, using that dataset.

C.2 Phase 2—Monitoring the Datastream

After training 304 the initial model in Phase 1, in Phase 2, an embodiment may monitor the data stream to create a data collection $D=\{D_0, D_1, \ldots, D_l\}$, so that every c instances in the stream defines a respective collection $D_i$ until the maximum number of collections l is achieved. Each collection may comprise a set of inputs X and its respective labels Y, $D_0=\{X, Y\}$, where $|X|=c$.

C.3 Phase 3—Identifying the Scheduling and Adapting the Model

In Phase 3 (see FIG. 2), and with reference now to FIG. 4, an embodiment may use the data collection generated previously in Phase 2 to identify the scheduling regime of the datastream, as either continual or discrete, for example. To do that, first, for each collection, an embodiment may build a table 400 where rows 402 represent instances by their IDs, and columns 404 are the prompt IDs that pertain to those instances. Recall that, in general, the prompts associated with an instance are generally indicative of a task associated with that instance, and a particular grouping of prompts may indicate a particular task.

For each instance, an embodiment may apply the pre-trained L2P to identify its k selected prompts IDs and mark them at the table 400 in a sequential order according to its distance to the input features. That is, for example, the closest prompt receives the number one at the table, the second closest receives the number two, and so on. FIG. 4 illustrates an example of an instance vs prompt ID table 400 where the number of selected prompts for each of the instances is k=2.

Next, an embodiment may define a minimum support, such as 0.2 for example, and apply a frequent sequence mining algorithm, an example of which is disclosed in "Srikant, Ramakrishnan, and Rakesh Agrawal. '*Mining sequential patterns: Generalizations and performance improvements.' Advances in Database Technology—EDBT '96: 5th International Conference on Extending Database Technology Avignon*, France, Mar. 25-29, 1996 Proceedings 5. Springer Berlin Heidelberg, 1996." ("Ramakrishnam") (incorporated herein in its entirety by this reference) to generate frequent sequences for each table, such as the example table 400, considering the order. FIG. 5 discloses a table 500 with examples of frequent sequences of prompt IDs 502.

In connection with the prompt ID table 400, which includes prompt IDs for various instances, the frequency of the sequences of those prompt IDs may be captured, as shown in the table 500 of FIG. 5. In particular, table 500 discloses, in simple terms, the number of times that a given set of prompts appears together (in %). By way of illustration, suppose that Itemset {0, 1} has a support of 0.2 (20%), it means the prompts {0, 1} were selected together in 20% of the instances in the data stream being analyzed. Thus, for example, and considering table, it can be seen that the prompts {0, 1} only occur in the prompt, or instance, ID 3.

Figures 6, 7:
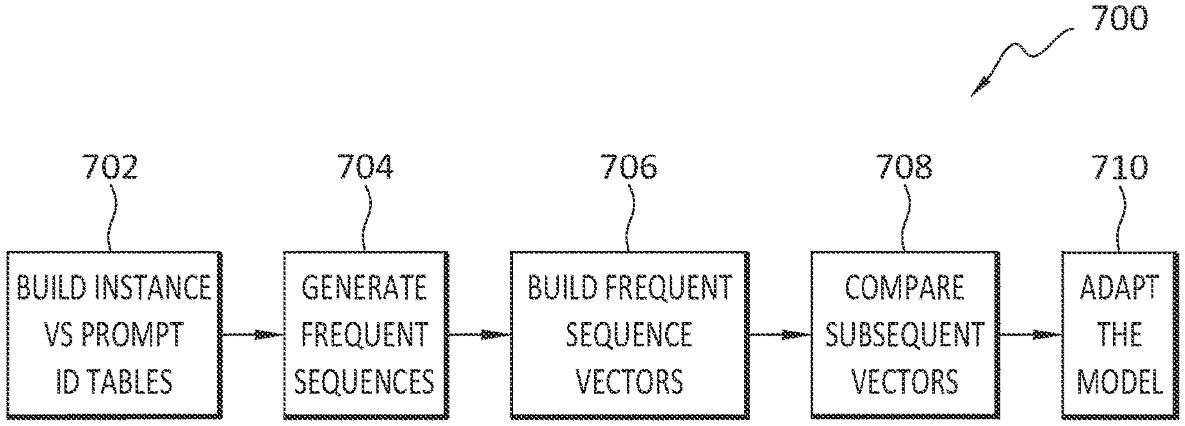
FIG. 6 discloses an example of the final table with a vector for each collection, according to one embodiment.
FIG. 7 discloses an overview of the third phase disclosed in FIG. 2, according to one embodiment.

Next, an embodiment may build a vector using the frequent sequence information, where each combination of prompts becomes a position in this vector, and a collection table 600, as shown in FIG. 6, in which rows 602 represent a collection, and column 604 is the vector with its frequent sequences. That is, the collection table 600 discloses a vector, comprising a respective set of frequent sequences of prompt IDs, for each of the collections that has been defined.

Next, for each collection i, an embodiment may compare the vector for that collection with the vector from the previous position i−1 using a distance metric, such as Jaccard distance for example. If the distance is greater than a predefined threshold th, the collections are deemed to be different, and the scheduling is discrete, since the change between two subsequent collections is abrupt.

If the distance between the two collections is not greater than the predefined threshold th, the collections are deemed to be similar, and the scheduling is identified as continuous. In addition, if it is the first table position, i=0, the previous position i−1 would be the data used in the last training. In this case, an embodiment may save the last collection l vector to be used in the next training to compare if the scheduling has changed. If the last training was the model initialization in Phase 1, an embodiment may generate the vector of frequent sequence for the dataset W and compare with i=0.

Finally, based on the type of scheduling that has been determined, an embodiment may then change L2P parameters and adapt the model to learn the new task with the current collection. Specifically, if the scheduling is discrete, an embodiment may enable the diversifying prompt-selection and, if not, an embodiment may disable the diversifying prompt-selection. FIG. 7 shows an overview of Phase 3.

In particular, Phase 3 may be implemented as a method 700 comprising various operations. At 702, one or more instance vs prompt ID tables may be built. Using the information in those tables, frequently occurring sequences of prompt IDs may be generated 704, and vectors created 706 using those frequently occurring sequences. An embodiment may save the last collection l vector to be used in the next training to compare 708 to determine if the scheduling has changed. Finally, the model may be adapted 710, or not, depending upon the outcome of the comparing 708. That is, if the scheduling has changed abruptly, the model may be modified accordingly.

D. Example Methods

It is noted with respect to the disclosed methods, including the example methods of FIGS. 2, 3 and 7, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

E. Further Example Embodiments

Following are some further example embodiments of the invention. These are presented only by way of example and are not intended to limit the scope of the invention in any way.

Embodiment 1. A method, comprising: training a task-agnostic continual learning (CL) model using prompt pool parameters and scheduling identification parameters, wherein the CL model comprises a machine learning model that is operable to perform tasks; monitoring a datastream that is provided to the CL model, and identifying every c instances of the datastream as a collection so that one or more collections are defined; and identifying, based on analysis of the datastream, a task scheduling type embodied in the datastream.

Embodiment 2. The method as recited in any preceding embodiment, wherein the prompt pool parameters comprise a number of selected prompts, and a size of the prompt pool.

Embodiment 3. The method as recited in any preceding embodiment, wherein the scheduling identification parameters comprise a look-up size in a number of collections, and a number of instances inside each collection of samples of the datastream.

Embodiment 4. The method as recited in any preceding embodiment, wherein the task scheduling type is identified as discrete.

Embodiment 5. The method as recited in any preceding embodiment, wherein the task scheduling type is identified as continuous.

Embodiment 6. The method as recited in any preceding embodiment, wherein identifying the task scheduling type is based on a comparison of one of the collections with another of the collections.

Embodiment 7. The method as recited in any preceding embodiment, wherein task boundaries pertaining to tasks implied by the datastream are unknown to the CL prior to identification of the task scheduling type.

Embodiment 8. The method as recited in any preceding embodiment, wherein one or more parameters of the CL model are automatically adapted on-the-fly when a change in the task scheduling type is identified.

Embodiment 9. The method as recited in any preceding embodiment, wherein the prompt pool parameters comprise L2P parameters.

Embodiment 10 The method as recited in any preceding embodiment, wherein the CL model is operable using both discrete task scheduling and continual task scheduling.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
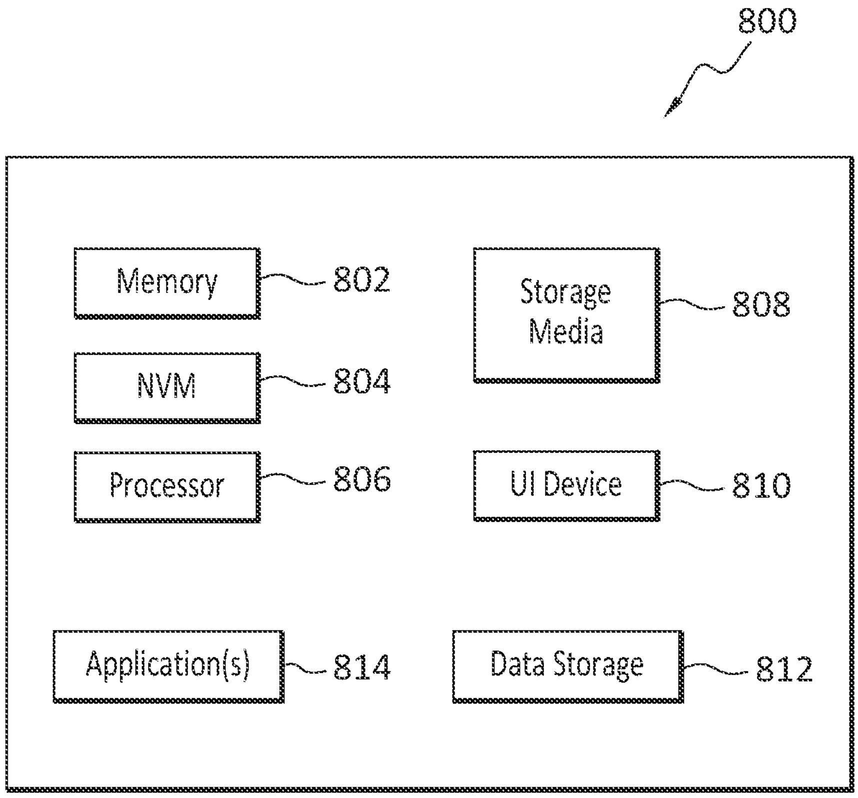
FIG. 8 discloses an example computing entity operable to perform any of the disclosed methods, processes, and operations.

With reference briefly now to FIG. 8, any one or more of the entities disclosed, or implied, by FIGS. 1-7, and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 8.

In the example of FIG. 8, the physical computing device 800 includes a memory 802 which may include one, some, or all, of random access memory (RAM), non-volatile memory (NVM) 804 such as NVRAM for example, read-only memory (ROM), and persistent memory, one or more hardware processors 806, non-transitory storage media 808, UI device 810, and data storage 812. One or more of the memory components 802 of the physical computing device

800 may take the form of solid state device (SSD) storage. As well, one or more applications 814 may be provided that comprise instructions executable by one or more hardware processors 806 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory storage medium having stored therein instructions that are executable by one or more hardware processors to perform operations comprising:

training a task-agnostic continual learning (CL) model using prompt pool parameters and scheduling identification parameters, wherein the CL model comprises a machine learning model that is operable to perform tasks;

monitoring a datastream that is provided to the CL model, and partitioning the datastream into collections, each comprising every c consecutive instances of the datastream so that one or more collections are defined; and identifying, based on a comparison of at least two of the collections derived from the datastream, whether the datastream exhibits discrete or continuous task scheduling, as a task scheduling type embodied in the datastream.

2. The non-transitory storage medium as recited in claim 1, wherein the prompt pool parameters comprise a number of selected prompts, and a size of the prompt pool.

3. The non-transitory storage medium as recited in claim 1, wherein the scheduling identification parameters comprise a look-up size in a number of collections, and a number of instances inside each collection of samples of the datastream.

4. The non-transitory storage medium as recited in claim 1, wherein the task scheduling type is identified as discrete.

5. The non-transitory storage medium as recited in claim 1, wherein the task scheduling type is identified as continuous.

6. The non-transitory storage medium as recited in claim 1, wherein task boundaries pertaining to tasks implied by the datastream are unknown to the CL prior to identification of the task scheduling type.

7. The non-transitory storage medium as recited in claim 1, wherein one or more parameters of the CL model are automatically adapted on-the-fly when a change in the task scheduling type is identified.

8. The non-transitory storage medium as recited in claim 1, wherein the prompt pool parameters comprise L2P parameters.

9. The non-transitory storage medium as recited in claim 1, wherein the CL model is operable using both discrete task scheduling and continual task scheduling.

10. A computer system comprising:

one or more hardware processors; and one or more non-transitory storage media having stored thereon instructions that are executable by the one or more hardware processors to cause the computer system to:

train a task-agnostic continual learning (CL) model using prompt pool parameters and scheduling identification parameters, wherein the CL model comprises a machine learning model that is operable to perform tasks;

monitor a datastream that is provided to the CL model, and partitioning the datastream into collections, each comprising every c consecutive instances of the datastream so that one or more collections are defined; and identify, based on a comparison of at least two of the collections derived from the datastream, whether the datastream exhibits discrete or continuous task scheduling, as a task scheduling type embodied in the datastream.

11. The computer system of claim 10, wherein the instructions further cause the computer system to, for each of the collections, build an instance-versus-prompt identification table in which rows correspond to instances in the collection and columns correspond to prompt identifiers associated with the CL model.

12. The computer system of claim 11, wherein the instructions further cause the computer system to identify, for each instance in the collection, a plurality of selected prompts based on similarity between input features of the instance and prompts in a prompt pool.

13. The computer system of claim 12, wherein the instructions further cause the computer system to assign an ordered ranking to the selected prompts for each instance based on respective distances between the input features and the prompts.

14. The computer system of claim 11, wherein the instructions further cause the computer system to generate, from the instance-versus-prompt identification table, one or more frequent prompt sequences that satisfy a predefined minimum support threshold.

15. The computer system of claim 14, wherein the instructions further cause the computer system to construct a vector for each collection, each vector comprising positions corresponding to combinations of prompts identified in the one or more frequent prompt sequences.

16. The computer system of claim 15, wherein the instructions further cause the computer system to compare vectors of consecutive collections using a distance metric to determine similarity between the collections.

17. The computer system of claim 16, wherein the distance metric comprises a Jaccard distance, and wherein the instructions further cause the computer system to determine that the datastream exhibits discrete task scheduling when the Jaccard distance exceeds a predefined threshold.

18. The computer system of claim 16, wherein the instructions further cause the computer system to determine that the datastream exhibits continuous task scheduling when the distance between vectors of consecutive collections is less than or equal to a predefined threshold.

19. The computer system of claim 10, wherein the instructions further cause the computer system to adapt one or more parameters of the CL model based on the identified task scheduling type.

20. The computer system of claim 19, wherein the instructions further cause the computer system to enable a diversifying prompt-selection mechanism when the identified task scheduling type is discrete and to disable the diversifying prompt-selection mechanism when the identified task scheduling type is continuous.

* * * * *